United States Patent [19]
Fletcher et al.

[11] 3,783,354

[45] Jan. 1, 1974

[54] PHASE PROTECTION SYSTEM FOR AC POWER LINES

[76] Inventors: James C. Fletcher, Administrator of the National Aeronautic and Space Administration with respect to an invention by; Wing J. Wong, 4054 Pelita Ave., Apt. 2, Los Angeles, Calif.

[22] Filed: Sept. 29, 1972

[21] Appl. No.: 293,727

[52] U.S. Cl. ............... 317/33 SC, 317/43, 317/46, 317/47, 317/48, 307/127
[51] Int. Cl. ............................................. H02h 3/26
[58] Field of Search ............. 317/43, 47, 48, 33 SC, 317/46; 307/127

[56] References Cited
UNITED STATES PATENTS

| | | | |
|---|---|---|---|
| 3,428,865 | 2/1969 | Opad | 317/48 |
| 3,213,321 | 10/1965 | Dalziel | 317/33 SC |
| 3,495,130 | 2/1970 | Bruner | 317/48 |

*Primary Examiner*—J. D. Miller
*Assistant Examiner*—Harvey Fendelman
*Attorney*—Marvin J. Marnock et al.

[57] ABSTRACT

A phase protection system is provided for protecting phase sensitive loads from being or remaining connected to AC power lines whenever a phase reversal occurs. It comprises a solid state phase detection circuit, a DC power relay circuit, an AC-to-DC converter for energizing the relay circuit, and a bi-stable 4-terminal transducer coupled between the phase detection circuit and the power relay circuit, for controlling both circuits.

5 Claims, 2 Drawing Figures

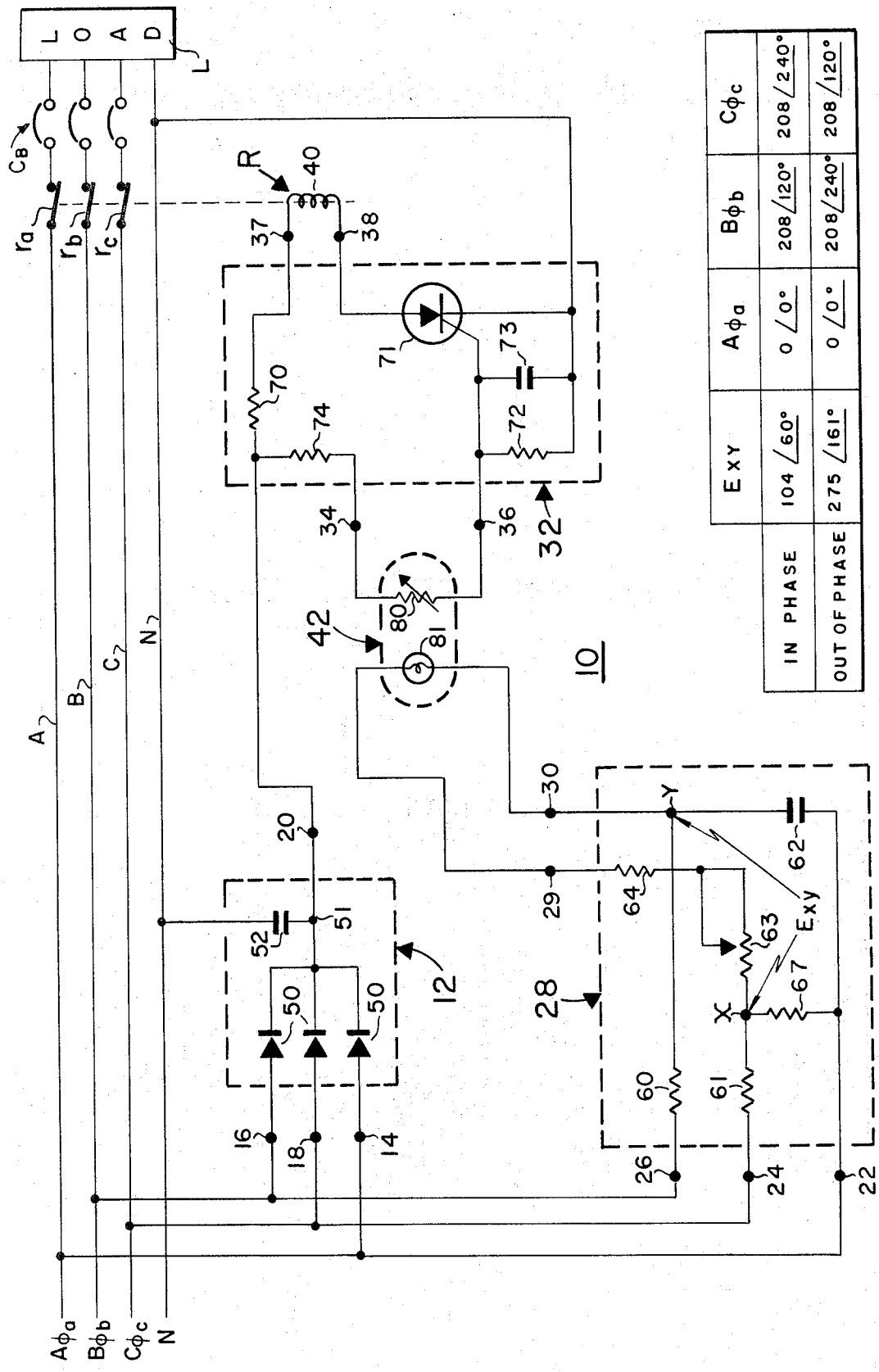

PHASE PROTECTION SYSTEM FOR AC POWER LINES

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 45 U.S.C. 2457).

BACKGROUND OF THE INVENTION

Phase protection circuits for AC power lines are well known. Such systems are described, for example, in U.S. Pat. Nos. 3,611,050, 3,536,957, 2,975,334, 3,202,877, 3,302,063 and 3,188,522. In the known prior art systems, as best exemplified by U.S. Pat. No. 3,611,050, a voltage sensitive relay is first used as the phase detection device to then activate a power relay. The switching by the power relay will prevent AC power from being applied to phase sensitive loads when the phase is reversed or when one of the power lines is opened or shorted. Such known circuits in addition to being expensive to manufacture also lack in reliability because, among other things, they require two relays.

SUMMARY OF THE INVENTION

An inexpensive 4-terminal solid state transducer, such as a voltage-to-light-to-impedance transducer is used to detect the phase reversal as well as to activate the power relay. The transducer is relatively inexpensive and is very reliable, at least as compared to a voltage-sensitive relay. For as long as power exists on at least one power line, an AC-to-DC converter energizes the power relay and an SCR in series with the relay.

In a preferred embodiment, the phase protection system for detecting a phase loss or reversal comprises a phase-detection circuit including a light emitting device which becomes actuated upon the occurrence of a phase reversal. A power relay, in series with current flow control means, responds to the emitted light for opening a normally closed pair of relay contacts in each power line, thereby protecting a phase sensitive load connected thereto.

BRIEF DESCRIPTION OF THE DRAWINGS

FIG. 1 shows a preferred embodiment of the invention, and

FIG. 2 is a table with typical operating values in the embodiment shown in FIG. 1.

GENERAL DESCRIPTION OF THE PROTECTION SYSTEM

FIG. 1 represents a phase-protected, polyphase network. For simplicity, it is shown to include three power lines A, B, C, and a neutral line N. The lines are energized by a polyphase, AC source (not shown) operating at a particular voltage and frequency, say 208 volts, 60 Hz or 400 Hz. Thus, lines A, B, C are generally powered for a particular frequency by voltages A $\phi_a$, B $\phi_b$ and C $\phi_c$ respectively, where A, B, C are in volts, and $\phi$ is the phase angle in degrees. In lines A, B, C, are inserted, in series, normally closed, relay terminals $r_a$, $r_b$, $r_c$, respectively. The terminals are controlled by a power relay R. Each of lines A, B, C has a circuit breaker CB. The lines are connected to a phase sensitive load L.

Load L is protected by a phase protection system, generally designated as 10. System 10 prevents power from being applied to load L when one of the phases is reversed, or when one of the lines A–C is opened or shorted (i.e., when a phase is lost). System 10 operates independently of and does not require an external power source. Throughout the description, the expression "phase reversal" or its equivalent will also include the case of an open or shorted line (loss of phase).

System 10 includes an AC-to-DC converter 12 preferably having three input terminals 14, 16, 18, connected to lines A, B, C, respectively. Converter 12 provides a DC voltage to its output terminal 20. Terminals 14, 18, 16 are also connected to the input terminals 22, 24, 26, respectively, of a phase detection circuit, generally designated as 28, having a pair of output terminals 29 and 30.

A DC power relay circuit, generally designated as 32, is provided with a pair of input terminals 34, 36, and a pair of output terminals 37, 38. Across output terminals 37, 38 is connected the coil 40 of relay R for controlling the opening of the relay's terminals $r_a$–$r_c$.

A 4-terminal bi-stable transducer, generally designated as 42, is connected between terminals 29, 30 and terminals 34, 36, as shown. Transducer 42 is, therefore, common to both the phase detection circuit 28 and the power relay circuit 32.

GENERAL MODE OF OPERATION OF THE SYSTEM

When a phase reversal occurs in the power lines A–C, the phase detection circuit 28 will cause a change in the voltage and phase across its output terminals 29, 30. A corresponding, drastic, impedance change will take place between terminals 34, 36. The impedance change is from nearly an open circuit to nearly a short circuit. As a result, DC current can now flow through the relay's coil 40. Activation of power relay R will open all three relay terminals $r_a$–$r_c$ and, hence, power lines A, B, C.

The AC-to-DC converter 12 supplies the DC power required for the operation of power relay R. As previously mentioned, converter 12 has an input adapted for connection to at least one of lines A–C, but preferably to all three lines.

DETAILED DESCRIPTION OF THE SYSTEM

Various circuit arrangements can be provided for carrying out the functions prescribed for the blocks within system 10.

In a preferred embodiment, the AC-to-DC converter 12 includes three half-wave rectifiers 50 connected to terminals 14, 16, 18, respectively, and to a common junction 51. Between terminal 51 and the neutral line N is connected a relatively large capacitor 52.

The phase detector circuit 28 includes resistors 60, 61, and a capacitor 62 connected to terminals 26, 24, 22, respectively. Resistor 60 and capacitor 62 have a common junction Y which is connected directly to output terminal 30. Between a junction X and output terminal 29 are connected, in series, a variable resistor 63 and a resistor 64. The junction X is connected to input 22 through a resistor 67. The potential difference between junctions X and Y is $E_{xy}$.

The power relay circuit 32 includes a resistor 70 and a silicon-controlled rectifier (SCR) 71 connected in series with and on either side of coil 40. The SCR's anode is connected to output terminal 38, its cathode is connected to line N, and its gate is connected to terminal 36. Connected in parallel between terminal 36 and line N is a resistor 72 and a capacitor 73. Between terminals 20 and 34 is connected a resistor 74.

The transducer 42 is a voltage-to-light-to-impedance transducer and includes a photo-conductor 80 and a "lamp" 81. The transducer is bi-stable with the lamp 81 either ON or OFF. Thus, resistors 72, 74, and photoconductor 80 constitute a voltage-divider network.

Depending upon the values of the components in the various circuits, the protection system 10 can be used on any three-phase source and at any frequency. System 10 can easily be modified, if desired, for a polyphase system with more than three phases.

DETAILED DESCRIPTION OF OPERATION

A. In the normal or in-phase operation the phase of line A is the base reference, and the phases of lines B & C follow in sequence.

By way of example only, for 208 volts AC, 60-Hz operation, the following component values provide proper operational results:

| | |
|---|---|
| Rectifier 50 | 1N5061GE |
| Resistor 60 | 100Kohms |
| Resistor 61 | 100Kohms |
| Resistor 67 | 100Kohms |
| Resistor 64 | 200Kohms |
| Resistor 72 | 500ohms |
| Resistor 70 | 1.5Kohms, 5 watts |
| Resistor 74 | 47.5Kohms, 1 watt |
| Resistor 63 | 1megohm |
| Capacitor 62 | 0.047microfarads |
| Capacitor 73 | 0.1microfarads |
| Capacitor 52 | 0.5 microfarads |
| Capacitor 73 | 0.1 microfarads |
| Relay R | P&B PM17DY 25 amps |
| SCR | 2N1598 Motorola |
| Transducer 42 | CK1124 Raytheon |
| CB | 25 amps |
| Load L | 25 amps |

With the above component values and for the voltage and phase values on lines A–C as indicated in FIG. 2, the "normal" or in-phase potential difference $E_{xy}$ between junction X and Y will be 104 volts, with the phase of the voltage at junction X lagging the voltage at junction Y by 60°, or $E_{xy}$= 104 60° VAC.

With $E_{xy}$= 104 volts, lamp 81 will be OFF. Consequently, the impedance between terminals 34 and 36 will be on the order of 10 megohms, and the SCR will not "fire." The firing of the SCR is primarily determined by the proper selection of the values for resistor 60 and capacitor 62.

B. In the out-of-phase operation, the phases of lines B & C are reversed. The result is that the potential difference between X and Y will now be $E_{xy}$= 275 161° VAC. Resistor 63 was adjusted so that lamp 81 turns ON, the resistance of the photoconductor 80 decreases, the potential at terminal 36 increases, and the SCR 71 fires, whereupon heavy current flows through the relay's coil 40 thereby causing its terminals $r_a$, $r_b$, $r_c$ to open. In this manner, load L will be protected from a phase reversal or from an open or short-circuited power line.

SUMMARY AND ADVANTAGES

It will be appreciated that the common, four-terminal, transducer 42 is an inexpensive, solid state device which is used both for phase detection and for power relay actuation. Transducer 42 is inherently more reliable than a voltage-sensitive relay commonly used as the phase detection element for actuating a power relay which serves as the switching device.

In other words, in the present invention the SCR-relay circuit accomplishes the switching function rather than the phase-detection function. When one of the power lines A–C is lost or reversed, the phase detection circuit 28 will cause lamp 81 to light and relay R to directly open the power lines A–C without the intervention of an auxiliary relay circuit.

Also, the activation of the power relay R is independent of an outside power source and the relay circuit 32 will remain energized as long as at least one phase or power line is "hot."

Although the invention has been described in great detail and with reference to three-phase operation and to particular components and values, it will be appreciated that more than three phases can be employed and other components and values may be used without departing from the scope of the invention, as defined by the claims appended hereto.

What is claimed is:

1. A phase protection system for detecting a phase reversal in a polyphase AC power line network including:

a phase detection circuit having at least three input terminals and a pair of output terminals, each input terminal being adapted for connection to one of the power lines;

a realy circuit having a pair of input terminals and comprising: a current control device, a power relay having relay contacts and a coil connected in series with said current control device, said coil controlling the switching of said contacts which are adapted for connection to the power lines;

an AC-to-DC converter whose input is adapted for connection to at least one of said power lines to provide to its output a DC potential for energizing said relay circuit;

a four-terminal bi-stable voltage-to-light-to-impedance transducer, coupled between the output terminals of said detection circuit and the input terminals to said relay circuit, said transducer being normally OFF, and said transducer turning ON upon the detection of said phase reversal by said phase detection circuit to thereby energize said coil which activates said contacts to open said lines, comprising a first resistor connected to the first of the phase detection circuit's input terminals, a second resistor connected to the second of its input terminals, a first capacitor connected to the third of its input terminals, said first resistor and said first capacitor having a junction Y, a third resistor connected to the third terminal, said second resistor and said third resistor having a junction X, a fourth resistor connected between junction X and a first terminal of said transducer, and said junction Y being connected to a second terminal of said transducer.

2. The system of claim 1 wherein said current control device is a silicon controlled rectifier (SCR).

3. The system of claim 2 wherein said relay circuit comprises:

a voltage divider circuit connected in series with the third and fourth terminals of said transducer; and an RC-network connected between the gate of said SCR and one of the terminals of said transducer, whereby the voltage across said RC network is low when said power lines are in phase, and said voltage is increased to a level sufficient to fire the SCR when the power lines are out of phase.

4. The system of claim 3 wherein, said AC-to-DC converter includes at least three rectifiers, each rectifier being connected between the output of the converter and a power line.

5. A phase protection system for detecting a phase reversal in a polyphase AC power line network including:

a phase detection circuit having at least three input terminals and a pair of output terminals, each input terminal being adapted for connection to one of the power lines;

a relay circuit having a pair of input terminals and comprising: a current control device, a power relay having relay contacts and a coil connected in series with said current control device, said coil controlling the switching of said contacts which are adapted for connection to the power lines;

an AC-to-DC converter whose input is adapted for connection to at least one of said power lines to provide to its output a DC potential for energizing said relay circuit;

a four-terminal bi-stable transducer, coupled between the output terminals of said detection circuit and the input terminals to said relay circuit, said transducer being normally OFF, and said transducer turning ON upon the detection of said phase reversal by said phase detection circuit to thereby energize said coil which activates said contacts to open said lines, said phase detection circuit comprising a first resistor connected to the first of the phase detection circuit's input terminals, a second resistor connected to the second of its input terminals, a first capacitor connected to the third of its input terminals, said first resistor and said first capacitor having a junction Y, a third resistor connected to the third terminal, said second resistor and said third resistor having a junction X, a fourth resistor connected between junction X and a first terminal of said transducer, and said junction Y being connected to a second terminal of said transducer.

* * * * *